June 20, 1967  E. E. ROSS ET AL  3,326,351
PRE-ORIENTER ALIGNER

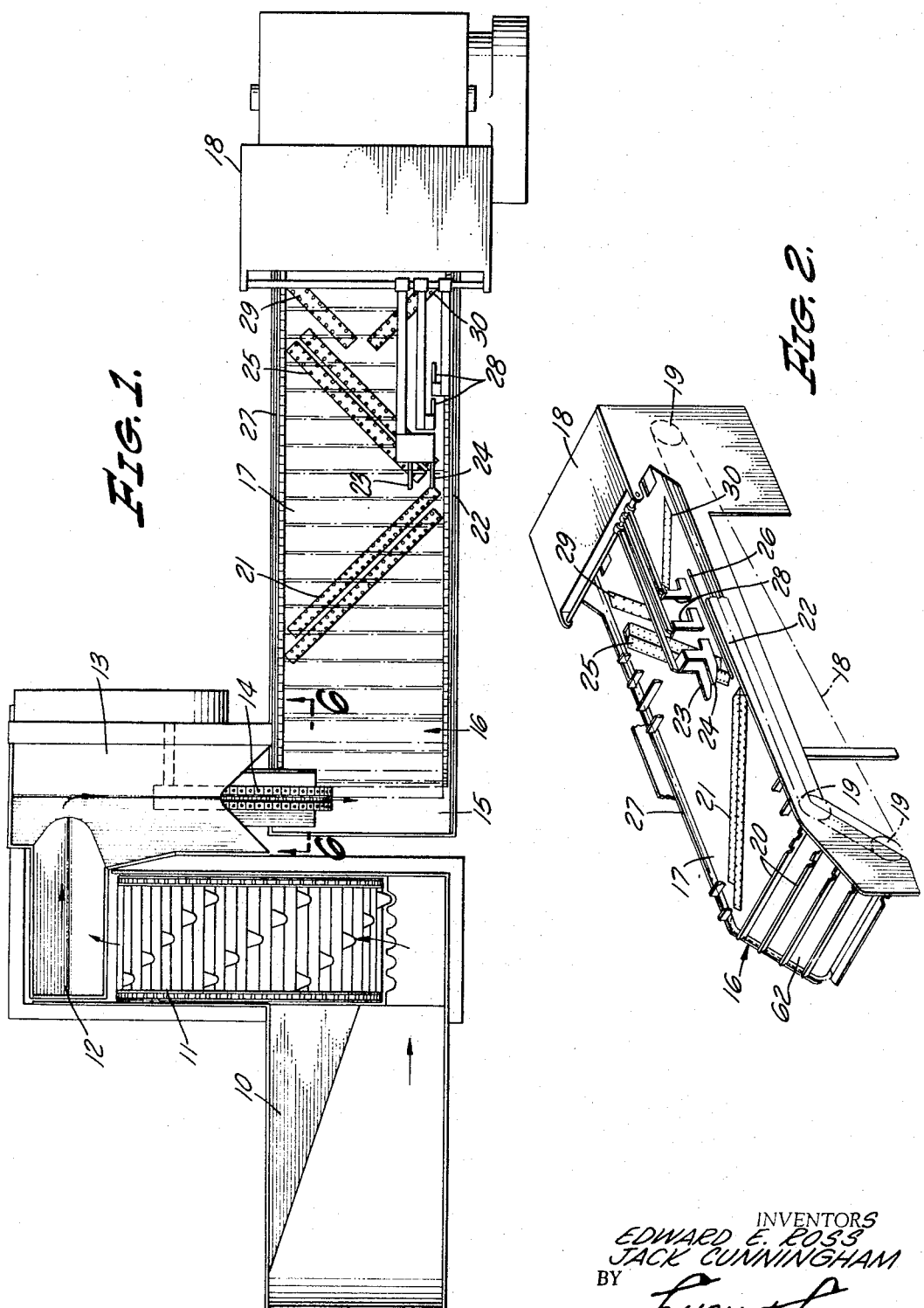

Filed Oct. 14, 1965  3 Sheets-Sheet 2

INVENTORS.
EDWARD E. ROSS
JACK CUNNINGHAM
BY
Lyon & Lyon
ATTORNEYS

INVENTORS.
EDWARD E. ROSS
JACK CUNNINGHAM
BY
Lyon & Lyon
ATTORNEYS

United States Patent Office 3,326,351
Patented June 20, 1967

3,326,351
PRE-ORIENTER ALIGNER
Edward E. Ross, Lafayette, and Jack Cunningham, San Francisco, Calif., assignors to California Packing Corp., San Francisco, Calif., a corporation of New York
Filed Oct. 14, 1965, Ser. No. 496,041
20 Claims. (Cl. 198—45)

ABSTRACT OF THE DISCLOSURE

Apparatus for aligning elongated articles (e.g., unhusked corn) and supplying them successively to the pockets of a conveyor. A first conveyor takes the articles individually from an unorganized mass and delivers them to an inclined aligning chute. The chute aligns the articles with their individual axes aligned with a common axis. A second accelerating conveyor receives the aligned articles from the chute and propels them into a trough from which they enter the pockets of a conveyor.

---

This invention relates to the processing of agricultural products and more particularly relates to a method and apparatus for aligning tapered agricultural products such as corn, carrots, turnips, parsnips and the like. The present invention is particularly useful when used in combination with the apparatus disclosed and claimed in U.S. patent application Ser. No. 394,486 filed by Edward E. Ross et al. on Sept. 4, 1964, and entitled, "Method and Apparatus for Orienting Tapered Agricultural Products," and assigned to the assignee of the present invention.

As set forth in the Ross et al. application, machinery is presently available that performs the steps of husking and cutting agricultural products such as corn. One of the problems encountered in the use of such machinery is the necessity of properly orienting the agricultural products prior to their being fed into the machinery. The method and apparatus disclosed in the aforementioned Ross et al. application solves this problem by automatically orienting agricultural products such as corn in the proper fashion to satisfy the requirements of the husking and butt cutting machinery.

As set forth in the aforementioned Ross et al. application, the disclosure which is incorporated by reference herein, a flighted conveyor feeds ears of corn or similar agricultural products to a feed table which contains apparatus whereby they are properly aligned. The present invention is particularly adapted for use with the Ross et al. invention in that it provides a method and apparatus for aligning ears of corn taken from a disorganized mass of corn and feeding it to the flighted conveyor. Briefly, this is accomplished by providing a metering conveyor which continuously removes corn from a disorganized mass of corn in a chute or hopper and feeds the corn, to an aligning chute. The aligning chute causes each ear of corn to be aligned in a proper direction and feeds the ears of corn to an accelerator conveyor which in turn feeds the ears of corn, properly aligned, to a feed trough from which they are removed by the flighted conveyor, one ear at a time.

It is therefore an object of the present invention to provide apparatus for aligning articles in a desired order.

It is another object of the present invention to provide a method for aligning articles in a desired order.

It is also an object of the present invention to provide apparatus for automatically and continuously converting a disorganized mass of tapered agricultural products into a stream of properly aligned products.

It is a further object of the present invention to provide apparatus for easily, economically and continuously feeding aligned agricultural products to processing machinery.

These and other objects of the present invention will become more apparent upon reference to the accompanying description and drawings in which:

FIGURE 1 is a top plan view of machinery for processing tapered agricultural products which includes the apparatus of the present invention;

FIGURE 2 is a perspective view of orienting apparatus such as that disclosed in the aforementioned Ross et al. application;

Figure 8:
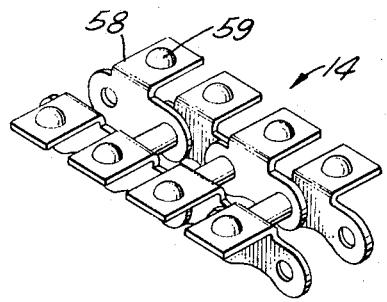
FIGURE 8 is a perspective view of the accelerating conveyor used in the apparatus of the present invention.
Figure 3:
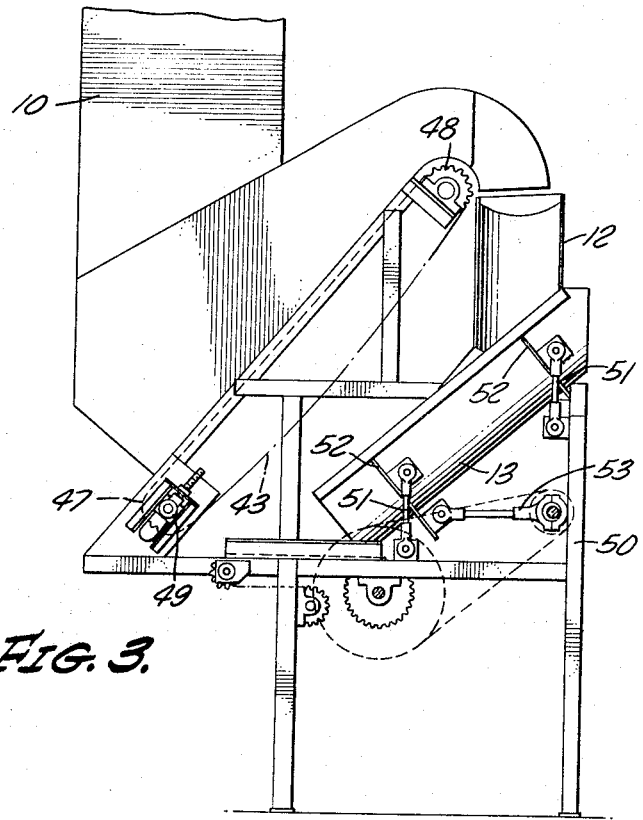
FIGURE 3 is a side elevation of the apparatus of the present invention.
Figure 4:
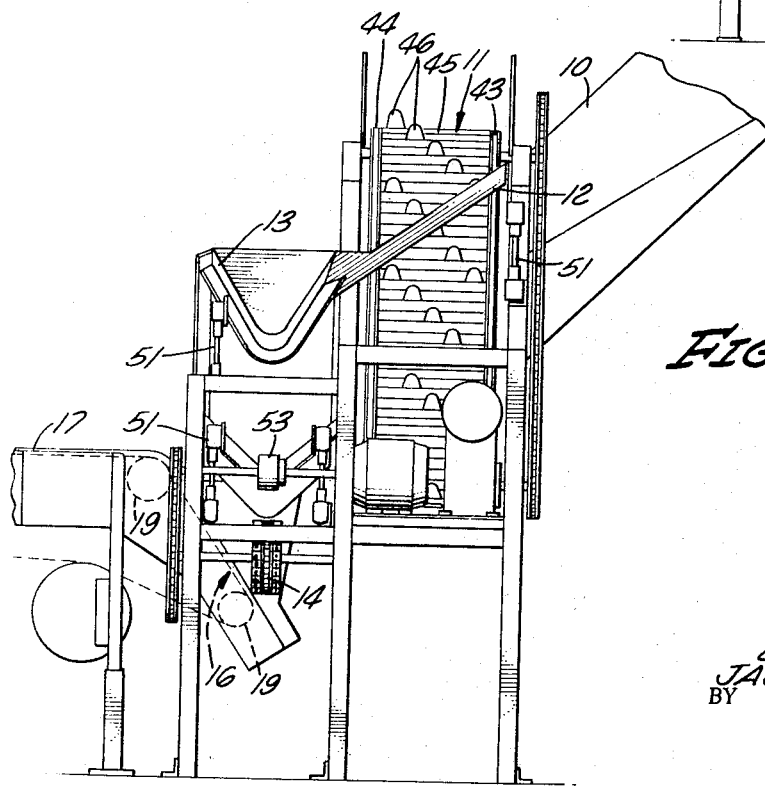
FIGURE 4 is a rear elevation of the apparatus of the present invention.
Figure 5:
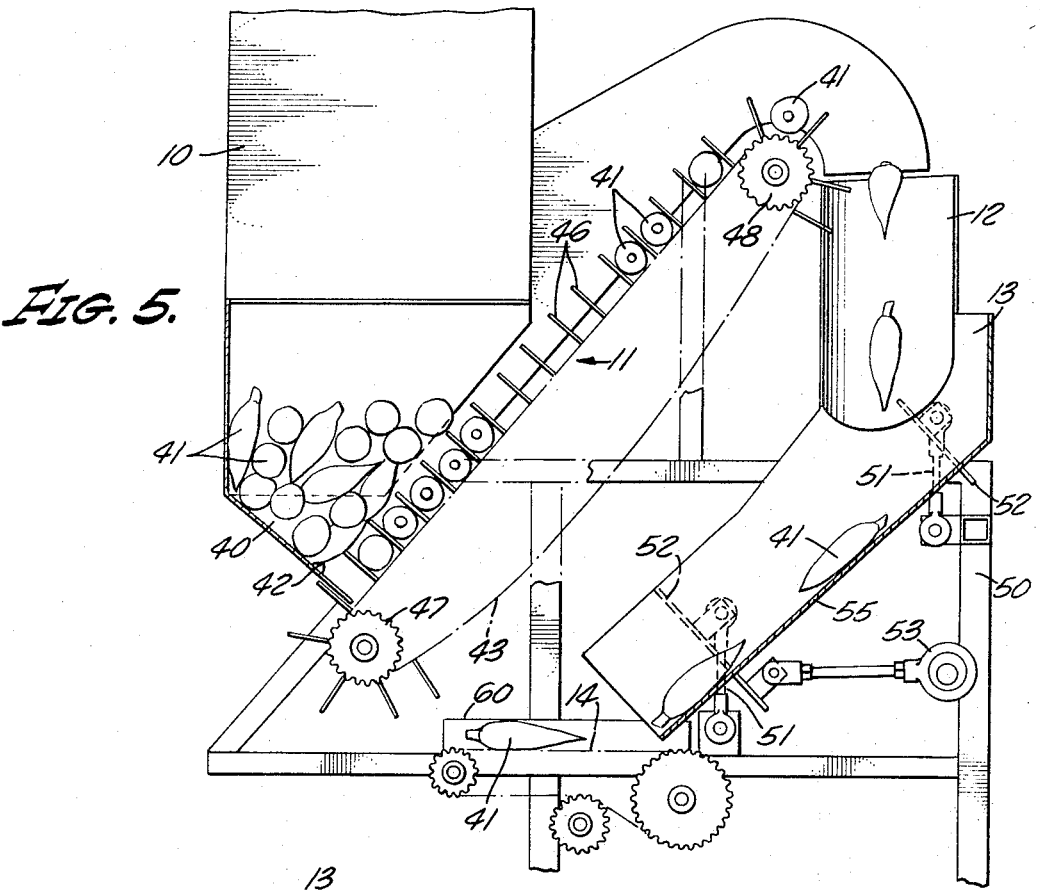
FIGURE 5 is a diagrammatic side elevation, partly in section, of the apparatus of the present invention.

Turning now to the drawings, FIGURE 1 shows the complete apparatus used in aligning, orienting, butt cutting and husking corn. It should be understood that while the present invention is described in terms of the processing of corn, this description is illustrative only, the present invention being equally useful for aligning articles other than tapered agricultural products such as corn. In FIGURE 1, there is shown a hopper or chute 10 for receiving the corn and holding it in a disorganized mass. A metering conveyor 11 is passed through this disorganized mass of corn and conveys the ears to an inclined feed chute 12 which deposits ears in an aligning chute 13. The ears are removed from the aligning chute 13 by an accelerator chain or conveyor 14 and propelled into a feed trough 15. A flighted conveyor 16 serves as one side of the feed trough 15 and serves to convey the aligned ears of corn, one at a time, to the feed table 17 where the ears are properly oriented and positioned as disclosed in the aforementioned Ross et al. application. They are then fed to butt cutting and husking machinery 18 of conventional design.

In order to better understand the utility and operation of the present invention, a brief description of one embodiment of the apparatus disclosed in the aforementioned Ross et al. application is presented herein. A more detailed description of this apparatus is found in the aforementioned Ross et al. application. The apparatus is shown diagrammatically in FIGURE 2. The flighted conveyor 16 feeds ears of corn, one at a time, to the feed table 17. The conveyor 16 consists of a chain, shown diagrammatically at 18, driven over suitable sprockets 19, also shown diagrammatically. The chain 18 carries a series of flights 20 consisting of flat bars extending laterally across the feed table which cause the ears of corn to move across the feed table 17. As the ears progress along the feed table 17, they will each encounter the diagonally running positioning chain 21 which acts to transfer the ears of corn diagonally across the feed table and against the stop 22.

Upon encountering the stop 22, and continuing the forward motion, the ears of corn next encounter the orienter presser feet 23 and 24. The presser feet 23 and 24 act in cooperation with a takeaway chain 25 and a hold wire or fulcrum 26 to cause each ear of corn to have its butt end encounter either the stop 22 or the corresponding stop 27 on the opposite side of the feed table 17. Additional presser feet 28 and takeaway chains 29 and 30 insure that the ears of corn are carried forward in their proper orientation to the butt cutting and husking apparatus 18.

Turning now to FIGURE 3 through 8, the details of the apparatus of the present invention are illustrated. The hopper or chute 10 terminates in a bin 40 in which is positioned a disorganized mass of ears of corn 41. The bottom of the bin 40 is provided with an opening 42 across which passes the metering conveyor 11. The metering conveyor is preferably made up of two side-by-side lengths of pintle chain 43 and 44 to which steel slats 45 are attached by rivets or the like between each set of links. A plurality of cleats 46 are welded or otherwise fastened in a desired pattern on the slats 45. The chains 43 and 44 are driven by sprockets 47 and 48, the sprocket 47 being provided with a conventional slack adjusting mechanism 49.

The cleats 46 are used to snag or pull ears of corn from the disorganized mass. The cleats may be made in any form but should have a height approximately equal to the diameter of the largest ear of corn so that they will support only one layer of corn on the conveyor. The cleats should be wide enough to prevent ears from sliding around them but narrow enough so that numerous cleats can be conveniently arranged in a pattern on the conveyor. The conveyor itself should be as narrow as possible without causing the longest ear of corn to lock or wedge between the retaining sides of the bin.

Experimentation has indicated that the preferred width of the conveyor is approximately 16 inches, although conveyors wider than 16 inches will work. However, the flow of corn from the metering conveyor becomes more sporadic and difficult to control, as the width of the conveyor is increased. It has been found that spade-shaped cleats approximately 3 inches wide at the bottom, 3 inches high and approximately 1 inch wide at the top arranged in a repetitive diagonal pattern of 5 cleats gives a fairly even distribution of corn over the entire metering conveyor and thus this arrangement is preferred. Of course, other shapes and patterns of cleats could be used so long as the cleats are positioned far enough apart so that ears can easily drop into pocket areas but not so distant that empty spots will be formed on the conveyor.

The metering conveyor II should be inclined relative to the vertical so that excess corn lying above the cleats will fall back into the bin 40. An angle of about 30 degrees from the horizontal appears to be sufficient to cause this falling back but an angle somewhat greater than this is desired for maximum effectiveness. The angle must not, however, be so steep that corn will fall out of the cleat pockets. This occurs at about 80 degrees. An angle of approximately 55 degrees to the horizontal has been found to be the most effective. A suitable length for the active surface of the metering conveyor has been found to be approximately 4 feet.

As the ears 41 of corn reach the apex of the metering conveyor 11, they fall off into the inclined feed chute 12 which is made integral with or welded or otherwise fastened to the aligning chute 13. The feed chute 12 could, of course, be eliminated and the aligning chute 13 positioned directly below the discharge end of the metering conveyor. The use of the feed chute 12, however, permits the metering conveyor 11 and aligning chute 13 to be positioned side-by-side and thus reduce the overall size of the machinery.

The aligning chute 13 and its attached feed chute 12 are mounted on a frame work 50 of any suitable design which also supports the other elements of the apparatus. The mounting of the chute 13 on the frame work 50 is accomplished by means of hanger arms 51, the ends of which are pivotably mounted to the frame work 50 and to flanges 52 provided on the chute 13. An eccentric drive 53 is also connected to one or more of the flanges 52 of the chute 13 for vibrating the chute 13 to prevent it from becoming clogged. The shaking action is only to prevent occasional clogging and has no other function, and the machine will operate for long periods without the vibrator or shaker.

The chute 13 is preferably U-shaped, that is, it has a rounded bottom portion 55 so that the ear will touch the chute in only one place. The radius of the rounded bottom portion 55 should be at least 2 inches which is larger than the diameter of the largest ear of corn. A V-shaped trough or chute will also work but since the corn will touch both sides of the chute, it will tend to wedge and not slide as freely as it will in a U-shaped chute. As can readily be seen, the aligning chute acts to align the ears in single file along a common axis as they are dropped into the upper end of the alignment chute 13. A suitable length for the aligning chute 13 has been found to be 18 inches and a suitable angle of incline to allow the corn to slide downward has been found to be between 30 degrees and 50 degrees. If the angle of incline is too shallow, the corn will not slide or will move too slowly; if too steep, the corn will tumble and loose its alignment. An angle of incline of 40 degrees has been found to give maximum performance. The chute should be wide enough so that ears can drop into it and have sides high enough to prevent ears from falling out. Dimensions of 10 inches wide at the top and 10 inches deep have been found to be quite satisfactory.

As the aligned ear of corn slides from the bottom of the chute 13, it falls on and is accelerated by the accelerator chain or conveyor 14. The accelerator chain 14 accelerates the ears of corn sufficiently so that they are propelled through the air across and into the feed trough 15. The accelerator chain 14, as can best be seen in FIGURE 8, is preferably made up of a suitable chain having chain attachments 58 with rivet tips 59 to grip and hold the ears of corn in alignment while they are being accelerated. Preferably, K-1 chain attachments are used for accelerating the corn, but dual standard chains spaced apart an appropriate distance, such as 1½ inches, or belts, can also be used to accelerate the ears of corn. It has been found that a preferred speed for the chain is 250 feet per minute. If the chain is run much slower than this, the corn will have a tendency to nose over and drop vertically into the feed trough 15. If it runs much faster, the corn will bounce and slow the machine. A suitable length for the accelerator chain 14 has been found to be 18 inches. The accelerator chain 14 is flanked by inclined sides 60 and 61 to insure that corn delivered by the trough 13 will be properly positioned on the accelerator chain.

Figure 6:
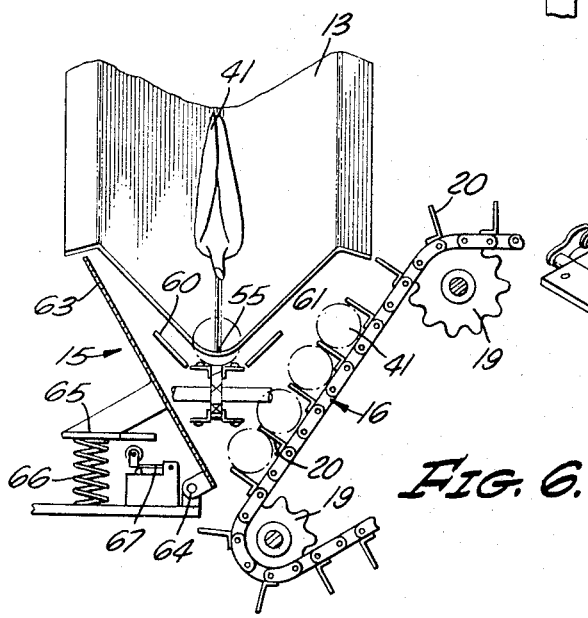
FIGURE 6 is an enlarged sectional view taken along lines 6—6 of FIGURE 1.
Figure 7:
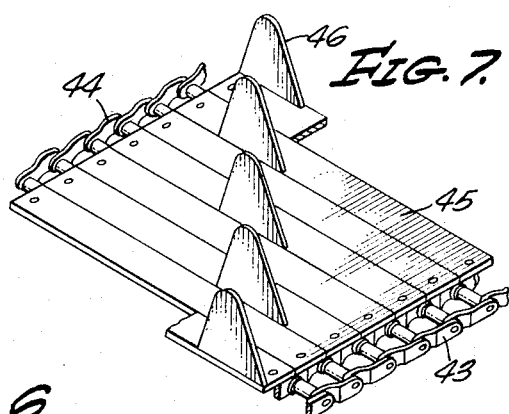
FIGURE 7 is a perspective view of the metering conveyor used in the apparatus of the present invention.

The feed trough 15 is positioned about 6 inches below the accelerator chain 14 and is preferably about 16 inches long so as to be able to handle the largest ears of corn. One side of the feed trough 15 is made up of an inclined end portion 62 (FIGURE 2) of the feed table 17 across which the flights 20 of the conveyor 16 pass. The other side of the trough consists of an end plate 63 (FIGURE 6). The feed trough 15 is located relative to the accelerator chain 14 so that ears of corn discharged by the accelerator chain will drop onto the end plate 63 and be deflected into the flight pockets of the conveyor 16. Each flight pocket of the conveyor 16 is only deep and wide enough to accommodate one ear of corn. It has been found that if the flights 20 are made 1½ inches high and 24 inches long and are spaced apart 3 inches, satisfactory operation is obtained. This spacing is such that there is room in each pocket for the largest diameter ear but not room for two medium or average ears.

To help prevent overloading of the machine, the end plate 63 is hinged at the bottom by hinge 64 and is provided with a plate 65 that is spring loaded by spring 66. A microswitch 67 is positioned below the plate 65. If the feed trough 15 becomes overloaded with corn, the end plate 63 will swing outward and downward and the plate 65 will contact the microswitch 67, thereby shutting off the metering conveyor 11.

The incline of the surface 62 across which the flights 20 of the conveyor 16 pass should be made steep enough so that the corn will fall back and not be carried up the conveyor unless it is in a flight pocket. The angle should also be shallow enough so that ears will not roll out of the flight pockets once they enter. An angle of 60 degrees with the horizontal has been found to be the most satisfactory angle of incline. The angle on the end plate 63 can be varied by varying the force exerted by the spring 66 and, of course, will be varied in accordance with the volume of corn in the trough 15. Preferably, the angle of the end plate 63 will be maintained between 60 degrees and 76 degrees with the horizontal. If the angle of the end plate 63 is too steep the corn will not be able to properly contact the end plate and will not be deflected into the flight pocket. If the end plate angle is too shallow the ears will not be deflected properly and will accumulate on the end plate and will slow or clog the machine.

The volume of corn which is fed into the orienting and husking machinery, is, of course, dependent on the speed of the metering conveyor 11. The metering conveyor speed is adjusted fast enough so that corn will fill most of the pockets of the flighted orienter entry conveyor 16 or the corn will overload the feed trough and clog the machine. If the speed of the metering conveyor 11 is sufficiently high to cause several ears to enter the feed trough at once, they will be held side-by-side alignment by the side of the feed trough until taken away one at a time by the flights 20 of the conveyor 16. In the event that too many ears are so collected, the microswitch 67 will be operated to turn off the metering conveyor as pointed out above.

It will be understood that the foregoing description of the present invention is illustrative only and not restrictive. Thus, while preferred dimensions, angles, speeds, and the like, have been given, and the apparatus described in connection with the processing of corn, it will be obvious that the various components and elements of the apparatus could assume different sizes and shapes and that other products could equally well be handled. By the use of the present invention, ears of corn or other articles can quickly, economically, and automatically be aligned in proper order for feeding into other processing machinery. This eliminates the necessity for hand alignment of the corn and makes possible a completely integrated automatic system for taking ears of corn from a disorganized mass of corn and processing them through butt cutting and husking operations.

The invention may be embodied in other specific forms not departing from the spirit or central characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. Apparatus for aligning a plurality of elongated articles taken from a disorganized mass of the same comprising: first conveyor means for disengaging individual articles from said mass; inclined chute means positioned adjacent the discharge end of said first conveyor means for receiving articles discharged therefrom and for aligning the individual longitudinal axes of said articles along a common axis; second conveyor means positioned adjacent the discharge end of said chute means for receiving articles discharged therefrom and for accelerating said articles in the direction of their length; and trough means positioned adjacent the discharge end of said second conveyor means for receiving articles discharged therefrom, one side of said trough means comprising third conveyor means having pockets for individually receiving said articles from said trough means.

2. Apparatus for aligning a plurality of elongated articles taken from a disorganized mass of the same comprising: first conveyor means passing adjacent said mass and having cleat means for disengaging individual articles from said mass; an inclined chute positioned adjacent the discharge end of said first conveyor means for receiving articles discharged therefrom, a portion of said chute having a lateral dimension such that the individual longitudinal axes of said articles are aligned along a common axis; second conveyor means positioned adjacent the discharge end of said chute for receiving articles discharged therefrom and accelerating said articles in the direction of their length; and trough means positioned adjacent the discharge end of second conveyor means for receiving articles discharged therefrom, one side of said trough means comprising third conveyor means having pockets for individually removing said articles from said trough means.

3. Apparatus for aligning a plurality of elongated articles taken from a disorganized mass of the same comprising: first conveyor means passing adjacent said mass and having cleat means for disengaging individual articles from said mass with the articles being spaced in the direction of movement of the conveyor; an inclined chute positioned adjacent the discharge end of said first conveyor means for receiving articles discharged therefrom, a portion of said chute having a lateral dimension such that the individual longitudinal axes of said articles are aligned along a common axis; second conveyor means positioned adjacent the discharge end of said chute for receiving articles discharged therefrom and accelerating said articles in the direction of their axes; and trough means positioned adjacent the discharge end of said second conveyor means, one side of said trough means comprising third conveyor means having pockets for individually removing said articles from said trough means and the other side of said trough means comprising a plate for receiving articles discharged by said second conveyor means and deflecting said articles into said pockets.

4. The apparatus of claim 3 wherein said plate is hingedly mounted and wherein means responsive to hinged movement of said plate are provided for disabling said first conveyor means.

5. The apparatus of claim 2 wherein said lateral dimension of said portion of said chute is greater than the lateral dimension of said articles.

6. Apparatus for aligning a plurality of elongated articles taken from a disorganized mass of the same comprising: first conveyor means passing adjacent said mass and having cleat means for disengaging individual articles from said mass with the articles being spaced in the direction of movement of the conveyor; an inclined chute positioned adjacent the discharge end of said first conveyor means for receiving articles discharged therefrom, said chute being generally U-shaped in cross-section with the radius of curvature of said U being slightly greater than one-half the lateral dimension of said articles whereby the individual longitudinal axes of said articles are aligned along a common axis; second conveyor means positioned adjacent the discharge end of said chute for receiving articles discharged therefrom and accelerating said articles; and trough means positioned adjacent the discharge end of said second conveyor means, one side of said trough means comprising third conveyor means having pockets for individually removing said articles from said trough means and the other side of said trough means comprising a plate for receiving articles discharged by said second conveyor means and deflecting said articles into said pockets.

7. The apparatus of claim 6 wherein said cleat means are spaced apart a distance at least equal to the lateral dimension of said articles.

8. The apparatus of claim 7 wherein said cleat means are diagonally arranged on said first conveyor means.

9. Apparatus for aligning a plurality of elongated articles taken from a disorganized mass of the same comprising: first conveyor means passing adjacent said mass and having cleat means for disengaging individual articles from said mass; said cleat means comprising including cleat members spaced apart in the direction of movement of the conveyor a distance that is at least equal to the lateral dimension of said articles and having a height approximately equal to the lateral dimension of said articles; an inclined chute positioned adjacent the discharge end of said first conveyor means for receiving articles discharged therefrom a portion of said chute having a lateral dimension such that the individual longitudinal axes of said articles are aligned along a common axis; second conveyor means positioned adjacent the discharge end of said chute for receiving articles discharged therefrom and accelerating said articles; and trough means positioned adjacent the discharge end of said second conveyor means for receiving articles discharged therefrom, one side of said trough means comprising third conveyor means having pockets for individually removing said articles from said trough means.

10. The apparatus of claim 9 wherein said cleat means are spade shaped.

11. Apparatus for aligning a plurality of elongated articles taken from a disorganized mass of the same comprising: first conveyor means passing adjacent said mass and having cleat means for disengaging individual articles from said mass with the articles spaced in the direction of movement of the conveyor; an inclined chute positioned adjacent the discharge end of said first conveyor means for receiving articles discharged therefrom, a portion of said chute having a lateral dimension such that the individual longitudinal axes of said articles are aligned along a common axis; chain means positioned adjacent the discharge end of said chute for receiving articles discharged therefrom and accelerating said articles, said chain means having attachments mounted thereon for maintaining said articles in axial alignment; and trough means positioned adjacent the discharge end of said conveyor means for receiving articles discharged therefrom, one side of said trough means comprising third conveyor means having pockets for individually removing said articles from said trough means.

12. The apparatus of claim 9 wherein said first conveyor means is inclined from the horizontal at a sufficient angle to prevent more than a single article to be held by each cleat means.

13. The apparatus of claim 12 wherein said angle of incline is approximately 55 degrees.

14. The apparatus of claim 2 wherein means are provided for vibrating said chute.

15. The apparatus of claim 2 wherein said chute is inclined at an angle of between 30 degrees and 50 degrees with the horizontal.

16. The apparatus of claim 15 wherein said angle is approximately 40 degrees with the horizontal.

17. Apparatus for aligning a plurality of ears of corn from a disorganized mass of corn in a hopper or the like comprising: metering conveyor means passing across an opening in said hopper, said metering conveyor means being inclined upwardly and having a plurality of cleats mounted diagonally thereon, said cleats being separated in the direction of movement of the conveyor by a distance at least equal to the diameter of the largest of said ears; said cleats acting to disengage and convey individual ears from said mass; an inclined chute having its upper end positioned beneath the discharge end of said metering conveyor means for receiving ears discharged one by one therefrom, said chute being generally U-shaped in cross-section with the radius of curvature of said U being slightly greater than one-half the diameter of the largest of said ears; accelerator conveyor means positioned below the bottom end of said chute for receiving ears discharged therefrom and accelerating them sufficiently to propel them; trough means positioned adjacent to and below said accelerator conveyor means, one side of said trough means comprising flighted conveyor means having pockets for individually removing ears from said trough means, the other side of said trough means comprising a plate for receiving ears successively propelled by said accelerator conveyor means and for deflecting said ears into said pockets; and means responsive to overloading of said trough means for disabling said metering conveyor means.

18. The apparatus of claim 17 wherein said metering conveyor is inclined at an angle of between 30 degrees and 80 degrees with the horizontal; said chute is inclined at an angle of between 30 degrees and 50 degrees with the horizontal; said plate is inclined at an angle of between 60 degrees and 76 degrees with the horizontal; and said flighted conveyor is inclined at an angle of approximately 60 degrees with the horizontal.

19. In a method of aligning a disorganized mass of elongated articles, the steps of disengaging individual articles from said mass and conveying the same away from the mass with the individual articles being spaced in the direction of conveying movement, aligning the articles after they are conveyed away from the mass, the aligning being carried out while the articles are sliding one behind the other over a supporting surface and serving to align the individual axes of the articles on a common axis, accelerating the articles after they have been so aligned to propel the same in the direction of their axes, and then causing the articles so propelled to be delivered to the pockets of a conveyor.

20. A method as in claim 19 in which the last step is carried out by deflecting the propelled articles into the pockets of the conveyor.

References Cited

UNITED STATES PATENTS

| | | | |
|---|---|---|---|
| 1,319,190 | 10/1919 | Van Hougten | 198—34 |
| 2,658,602 | 11/1953 | Bonanno | 198—55 |
| 2,810,467 | 10/1957 | Bogaty | 198—57 |

FOREIGN PATENTS 290,555   5/1953   Switzerland.

EVON C. BLUNK, *Primary Examiner.*

RICHARD E. AEGERTER, *Examiner.*